US011465395B2

(12) United States Patent
Ludlow et al.

(10) Patent No.: US 11,465,395 B2
(45) Date of Patent: Oct. 11, 2022

(54) MULTILAYER FLEXIBLE TUBE AND METHODS FOR MAKING SAME

(71) Applicant: SAINT-GOBAIN PERFORMANCE PLASTICS CORPORATION, Solon, OH (US)

(72) Inventors: James Ludlow, Medina, OH (US); Morgan D. Heskett, Akron, OH (US); Kevin M. McCauley, Town of Tonawanda, NY (US); Michael J. Tzivanis, Chicopee, MA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

(21) Appl. No.: 16/879,400

(22) Filed: May 20, 2020

(65) Prior Publication Data

US 2020/0369013 A1    Nov. 26, 2020

Related U.S. Application Data

(60) Provisional application No. 62/851,397, filed on May 22, 2019.

(51) Int. Cl.
*B32B 27/30* (2006.01)
*B32B 27/08* (2006.01)
(Continued)

(52) U.S. Cl.
CPC ............ *B32B 27/304* (2013.01); *B29C 48/10* (2019.02); *B32B 27/08* (2013.01); *B32B 27/322* (2013.01); *B32B 27/34* (2013.01); *B32B 27/40* (2013.01); *B32B 2250/03* (2013.01); *B32B 2250/24* (2013.01); *B32B 2270/00* (2013.01); *B32B 2307/536* (2013.01); *B32B 2307/738* (2013.01)

(58) Field of Classification Search
CPC ..... B32B 27/304; B32B 27/08; B32B 27/322; B32B 27/34; B32B 27/40; B32B 2307/738; B32B 2250/03; B32B 2250/24; B32B 2270/00; B32B 2307/536; B29C 48/10

See application file for complete search history.

(56) References Cited

U.S. PATENT DOCUMENTS 5,143,761 A * 9/1992 Chiotis ................. C09J 127/12
                                                        428/35.1
5,566,720 A   10/1996 Cheney et al.
(Continued)

FOREIGN PATENT DOCUMENTS

WO       20160186111 A1    11/2016

*Primary Examiner* — Michael C Miggins
(74) *Attorney, Agent, or Firm* — Abel Schillinger, LLP; Chi Suk Kim

(57) ABSTRACT

A multilayer flexible tube includes an inner layer including a melt processable fluoropolymer, wherein the melt processable fluoropolymer includes a terpolymer including a tetrafluoroethylene, a hexafluoropropylene, and a vinylidene fluoride (THV); a tie layer including a polymeric blend of a terpolymer including a tetrafluoroethylene, a hexafluoropropylene, and a vinylidene fluoride (THV) with a poly vinylidene fluoride (PVDF), a polyamide, a polyetheramide block copolymer, or combination thereof; and an outer layer including a melt processable polymer having a shore hardness less than a shore hardness of the inner layer.

17 Claims, 3 Drawing Sheets

(51) Int. Cl.
    *B32B 27/32*     (2006.01)
    *B32B 27/34*     (2006.01)
    *B32B 27/40*     (2006.01)
    *B29C 48/10*     (2019.01)

(56) References Cited

U.S. PATENT DOCUMENTS

| | | |
|---|---|---|
| 6,287,508 B1 | 9/2001 | Stripe |
| 6,293,312 B1 | 9/2001 | Stripe |
| 6,686,012 B1 | 2/2004 | Molnar et al. |
| 6,776,195 B2 | 8/2004 | Blasko et al. |
| 6,849,314 B2 | 2/2005 | Jing et al. |
| 7,192,646 B2 | 3/2007 | Dimascio et al. |
| 7,569,275 B2 | 8/2009 | Fukushi et al. |
| 2006/0099368 A1 | 5/2006 | Park |
| 2007/0023141 A1* | 2/2007 | Mehan .................. B29C 66/731 156/327 |
| 2007/0044906 A1 | 3/2007 | Park |
| 2007/0065616 A1 | 3/2007 | Fauble |
| 2007/0087150 A1 | 4/2007 | Powell et al. |
| 2007/0190284 A1* | 8/2007 | Park ...................... B32B 27/322 428/66.4 |
| 2007/0259147 A1 | 11/2007 | Boudry et al. |
| 2009/0169790 A1 | 7/2009 | Nadeau et al. |
| 2016/0160090 A1 | 6/2016 | Wang et al. |
| 2017/0261132 A1 | 9/2017 | Garver et al. |

\* cited by examiner

MULTILAYER FLEXIBLE TUBE AND METHODS FOR MAKING SAME

CROSS-REFERENCE TO RELATED APPLICATION(S)

This application claims priority under 35 U.S.C. § 119(e) to U.S. Patent Application No. 62/851,397 entitled "MULTILAYER FLEXIBLE TUBE AND METHODS FOR MAKING SAME", by James LUDLOW et al., filed May 22, 2019, which is assigned to the current assignee hereof and incorporated herein by reference in its entirety

FIELD OF THE DISCLOSURE

This application in general, relates to multilayer flexible tube and methods for making same, and in particular, relates to multilayer fluid conduits.

BACKGROUND

Hoses and tubing are used in a variety of industries including food processing, chemical industries, pharmaceutical industries, and fuel industries. In such industries, fluid conduits that have a low surface energy inner surface are used because they are easy to clean and resistant to contaminants. In particular, such industries are turning to low surface energy polymers such as fluoropolymers. However, such fluoropolymers are expensive and often have undesirable properties for certain applications.

Industry uses such fluoropolymers as liners for fluid conduit. However, many fluoropolymers desirable as an inner surface are difficult to adhere to other surfaces. For instance, when exposed to certain solvents, such as fuel, delamination between a fluoropolymer and a substrate typically occurs. Further, many fluoropolymers also are inflexible, making the material undesirable for applications that require stress, such as bend radius, pressures, and the like.

As such, an improved multilayer polymer article would be desirable.

SUMMARY

In an embodiment, a multilayer flexible tube includes an inner layer including a melt processable fluoropolymer, wherein the melt processable fluoropolymer includes a terpolymer including a tetrafluoroethylene, a hexafluoropropylene, and a vinylidene fluoride (THV); a tie layer including a polymeric blend of a terpolymer including a tetrafluoroethylene, a hexafluoropropylene, and a vinylidene fluoride (THV) with a poly vinylidene fluoride (PVDF), a polyamide, a polyetheramide block copolymer, or combination thereof; and an outer layer including a melt processable polymer having a shore hardness less than a shore hardness of the inner layer.

In another embodiment, a method of making a multilayer flexible tube includes providing an inner layer including a melt processable fluoropolymer, wherein the melt processable fluoropolymer includes a terpolymer including a tetrafluoroethylene, a hexafluoropropylene, and a vinylidene fluoride (THV); providing a tie layer including a polymeric blend of a terpolymer including a tetrafluoroethylene, a hexafluoropropylene, and a vinylidene fluoride (THV) with a poly vinylidene fluoride (PVDF), a polyamide, a polyetheramide block copolymer, or combination thereof; and providing an outer layer including a melt processable polymer having a shore hardness less than a shore hardness of the inner layer.

In a particular embodiment, a multilayer flexible tube includes an inner layer including a melt processable fluoropolymer, wherein the melt processable fluoropolymer includes a terpolymer including a tetrafluoroethylene, a hexafluoropropylene, and a vinylidene fluoride; a tie layer directly in contact with the inner layer, wherein the tie layer includes a polymeric blend of a terpolymer including a tetrafluoroethylene, a hexafluoropropylene, and a vinylidenefluoride (THV) with a poly vinylidene fluoride (PVDF); and an outer layer directly in contact with the tie layer, wherein the outer layer includes a melt processable polymer having a shore hardness less than a shore hardness of the inner layer.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
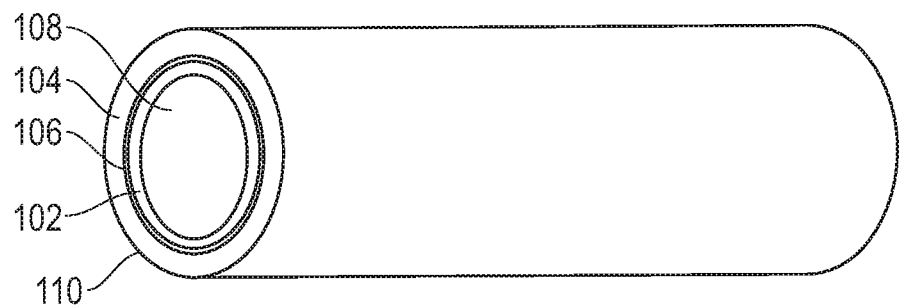
FIG. 1 includes an illustration of an exemplary multilayer flexible tube.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises", "comprising", "includes", "including", "has", "having" or any other variation thereof, are open-ended terms and should be interpreted to mean "including, but not limited to . . . ." These terms encompass the more restrictive terms "consisting essentially of" and "consisting of." In an embodiment, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts. Unless indicated otherwise, all measurements are at about 23° C.+/−5° C. per ASTM, unless indicated otherwise.

In a particular embodiment, a multilayer flexible tube is provided. The multilayer flexible tube includes an inner layer, a tie layer, and an outer layer. In an embodiment, the inner layer includes a fluoropolymer. In an embodiment, the tie layer includes a polymeric blend. Further, the outer layer includes a polymer having a shore hardness less than a shore hardness of the inner layer. Advantageously, the multilayer flexible tube has properties for applications that include exposure to chemicals, exposure to fuel, dynamic stress, exposure to low temperatures, or combination thereof. A method of making a multilayer flexible tube is further provided.

The fluoropolymer of the inner layer typically includes a melt processable fluoropolymer. "Melt processable fluoropolymer" as used herein refers to a fluoropolymer that can melt and flow to extrude in any reasonable form such as films, tubes, fibers, molded articles, or sheets. An exemplary melt processable fluoropolymer of the inner layer may be formed of a homopolymer, copolymer, terpolymer, or polymer blend formed from a monomer, such as tetrafluoroethylene, hexafluoropropylene, chlorotrifluoroethylene, trifluoroethylene, vinylidene fluoride, vinyl fluoride, perfluoropropyl vinyl ether, perfluoromethyl vinyl ether, or any combination thereof. An exemplary melt processable fluoropolymer includes a copolymer of a poly vinylidene fluoride (PVDF) and a hexafluoropropylene (HFP), a polytetrafluoroethylene (PTFE), a fluorinated ethylene propylene copolymer (FEP), a copolymer of tetrafluoroethylene and perfluoropropyl vinyl ether (PFA), a copolymer of tetrafluoroethylene and perfluoromethyl vinyl ether (MFA), a copolymer of ethylene and tetrafluoroethylene (ETFE), a copolymer of ethylene and chlorotrifluoroethylene (ECTFE), a polychlorotrifluoroethylene (PCTFE), a poly vinylidene fluoride (PVDF), a terpolymer including a tetrafluoroethylene, a hexafluoropropylene, and a vinylidenefluoride (THV), a polyvinyl fluoride (PVF, e.g., Tedlar™), a terpolymer of tetrafluoroethylene, hexafluoropropylene, and ethylene, any blend, any alloy, or combination thereof. In a particular embodiment, the inner layer is a terpolymer including a tetrafluoroethylene, a hexafluoropropylene, and a vinylidenefluoride (THV). In an embodiment, the inner layer of the terpolymer including the tetrafluoroethylene, the hexafluoropropylene, and the vinylidenefluoride (THV) provides advantageous barrier properties to the multilayer tube, even with the inner layer having a thickness that is thinner compared to other fluoropolymer materials. For instance and in comparison, a PVDF inner layer would typically need a greater thickness to achieve equivalent barrier properties to a thinner THV inner layer.

In a further embodiment, the inner layer may include any additive envisioned. The additive may include, for example, a co-agent, an antioxidant, a filler, an ultraviolet (UV) agent, a dye, a pigment, an anti-aging agent, a plasticizer, the like, or combination thereof. In an embodiment, the co-agent is a cross-linking agent provided to increase and/or enhance crosslinking of the fluoropolymer composition of the inner layer. In a further embodiment, the use of a co-agent may provide desirable properties such as decreased permeation of small molecules and improved elastic recovery of the inner layer compared to an inner layer that does not include a co-agent. Any co-agent is envisioned such as, for example, bis-phenol AF, triaryl isocyanurate (TAIL), triaryl cyanurate (TAC), an organic peroxide, or combination thereof. Any amount of co-agent is envisioned. Alternatively, the inner layer may be substantially free of a crosslinking agent, a co-agent, a photoinitiator, a filler, a plasticizer, or a combination thereof. "Substantially free" as used herein refers to less than about 1.0% by weight, or even less than about 0.1% by weight of the total weight of the fluoropolymer of the inner layer.

In a particular embodiment, the inner layer includes at least 70% by weight of the fluoropolymer. For example, the inner layer may include at least 85% by weight fluoropolymer, such as at least 90% by weight, at least 95% by weight, or even 100% by weight of the fluoropolymer. In an example, the inner layer may consist essentially of the fluoropolymer. In a particular example, the inner layer may consist essentially of the terpolymer including the tetrafluoroethylene, the hexafluoropropylene, and the vinylidenefluoride (THV). As used herein, the phrase "consists essentially of" used in connection with the fluoropolymer of the inner layer precludes the presence of other fluoropolymers and non-fluorinated polymers that affect the basic and novel characteristics of the fluoropolymer, although, commonly used processing agents and additives such as antioxidants, fillers, UV agents, dyes, pigments, anti-aging agents, and any combination thereof may be used in the fluoropolymer.

In a particular embodiment, the melt processable fluoropolymer has a desirable hardness. For instance, the shore hardness of the fluoropolymer of the inner layer is greater than the shore hardness of the polymer of the outer layer. For instance, the hardness of the inner layer is shore D of less than about 95, such as a shore A of about 80 to shore D of about 95, such as shore A of about 80 to shore D of about 65, such as shore A of about 85 to about 90 as measured by ASTM D2240. For instance, the terpolymer including the tetrafluoroethylene, the hexafluoropropylene, and the vinylidenefluoride (THV) for the inner layer has a hardness of shore D of less than about 95, such as a shore A of about 80 to shore D of about 95, such as shore A of about 80 to shore D of about 65, such as shore A of about 85 to about 90 as measured by ASTM D2240.

In an example, the melt processable fluoropolymer of the inner layer has desirable mechanical properties, such as a desirable elongation at yield and flexural modulus. In an embodiment, the melt processable fluoropolymer has an elongation at yield of greater than about 5%, such as greater than about 7%, such as greater than about 8%, or even greater than about 10%. The flexural modulus of the inner layer may be less than about 20,000 psi, such as less than about 15,000 psi, such as less than about 12,000 psi, or even less than about 10,000 psi, as measured by ASTM D790. In a particular embodiment, the flexural modulus of the terpolymer including the tetrafluoroethylene, the hexafluoropropylene, and the vinylidenefluoride (THV) for the inner layer may be less than about 20,000 psi, such as less than about 15,000 psi, such as less than about 12,000 psi, or even less than about 10,000 psi, as measured by ASTM D790.

The multilayer flexible tube further includes a tie layer. The tie layer provides desirable adhesion to the layers to which it is adjacent to. The tie layer may include any reasonable polymeric component. In an exemplary embodiment, the tie layer includes a thermoplastic material. For instance, the thermoplastic material may include a thermoplastic elastomer, such as cross-linkable elastomeric polymers of natural or synthetic origin. For example, an exemplary elastomeric material may include silicone, natural rubber, urethane, olefinic elastomer, diene elastomer, blend of olefinic and diene elastomer, fluoropolymer, perfluoroelastomer, polyamide, polyetheramide block copolymer, blend, or any combination thereof. In an embodiment, the fluoropolymer of the tie layer includes a melt processable fluoropolymer as described for the inner layer. In an embodiment, the tie layer includes a polymeric blend including the melt processable fluoropolymer as described for the inner layer blended with a polymeric component that provides desirable adhesion to the outer layer. Although not to be bound by theory, it is surmised that the blend components chosen leads to enhanced bonding between the tie layer and the layer it is directly adjacent to. For instance, with the polymeric blend, the fluoropolymer component of the tie layer has enhanced bonding to the inner layer and the polymeric component of the tie layer has enhanced bonding to the outer layer. For instance, the tie layer has a peel force value of greater than 6 lbf/in, such as greater than 15 lbf/in, or even greater than 25 lbf/in at a peel rate of 10 in/min as measured by ASTM D413 to the layer it is directly adjacent to.

In an embodiment, the tie layer may be a polymeric blend including a fluoropolymer of the inner layer with another melt processable fluoropolymer, a polyamide, a polyetheramide block copolymer, or combination thereof. In a particular embodiment, the tie layer may be a terpolymer including a tetrafluoroethylene, a hexafluoropropylene, and a vinylidene fluoride (THV) blended with a melt processable fluoropolymer, a polyamide, a polyetheramide block copolymer, or combination thereof. In a particular embodiment, the tie layer may be a terpolymer including a tetrafluoroethylene, a hexafluoropropylene, and a vinylidene fluoride (THV) blended with a poly vinylidene fluoride (PVDF), a polyamide, a polyetheramide block copolymer, or combination thereof. In a more particular embodiment, the tie layer includes a terpolymer including a tetrafluoroethylene, a hexafluoropropylene, and a vinylidene fluoride (THV) blended with a poly vinylidene fluoride (PVDF).

The polymeric blend of the tie layer includes any reasonable ratio of each polymeric component. In an example, the polymeric blend of the terpolymer including a tetrafluoroethylene, a hexafluoropropylene, and a vinylidene fluoride (THV) with another melt processable fluoropolymer, a polyamide, an elastomeric polyetheramide block copolymer, or combination thereof is at a blend ratio of 1:99 to 99:1, such as about 20:80 to 80:20, or about 30:70 to 70:30 depending on specific gravity of each material. In an example, the polymeric blend of the terpolymer including the tetrafluoroethylene, the hexafluoropropylene, and the vinylidene fluoride (THV) with the poly vinylidene fluoride (PVDF) is at a blend ratio of 1:99 to 99:1, such as about 20:80 to 80:20, or about 30:70 to 70:30 depending on specific gravity of each material. It will be appreciated that the polymeric blend ratio can be within a range between any of the minimum and maximum values noted above.

The tie layer may further include an adhesion promoter added to at least one polymeric component of the tie layer to increase the adhesion of the tie layer to at least one layer it is directly adjacent to such as, for example, the outer layer, the inner layer, or combination thereof. For instance, the adhesion promoter includes an adhesion promoter, the adhesion promoter comprising a maleic anhydride grafted PVDF, a silane-based adhesion promoter, an epoxy-based chemical, an ethylene vinyl alcohol (EVOH), acrylate polymer, an acrylate copolymer, an acetal copolymer, a thermoplastic with polarity, an amine functionalized adhesion promoter, an amine functionalized polymer, or combination thereof.

In an exemplary embodiment, the polymeric blend of the tie layer may further include any reasonable additive such as a crosslinking agent, a co-agent, a photoinitiator, a filler, a plasticizer, or any combination thereof. Any co-agent is envisioned that increases and/or enhances crosslinking of the polymer composition of the tie layer. In a further embodiment, the use of a co-agent may provide desirable properties such as decreased permeation of small molecules and improved elastic recovery of the tie layer compared to a tie layer that does not include a co-agent. Any co-agent is envisioned such as, for example, bis-phenol AF, triaryl isocyanurate (TAIL), triaryl cyanurate (TAC), an organic peroxide, or combination thereof. Any reasonable amount of co-agent is envisioned. Alternatively, the tie layer may be substantially free of any crosslinking agent, co-agent, photoinitiator, filler, plasticizer, or a combination thereof. "Substantially free" as used herein refers to less than about 1.0% by weight, or even less than about 0.1% by weight of the total weight of the polymer of the tie layer.

The multilayer flexible tube further includes an outer layer, the outer layer being a more flexible polymer compared to the inner layer. In an embodiment, the outer layer is a "melt processable polymer". "Melt processable polymer" as used herein refers to a polymer that can melt and flow to extrude in any reasonable form such as films, tubes, fibers, molded articles, or sheets. In an embodiment, the melt processable polymer of the outer layer includes any thermoplastic or thermoset envisioned having a shore hardness that is less than the shore hardness of the inner layer. In an embodiment, the polymer of the outer layer is a melt processable polymer including a thermoplastic polyurethane, a thermoset urethane, a fluoroelastomer, a diene elastomer, a thermoplastic EPDM composite, a styrene-based elastomer, a polyolefin elastomer, a flexible polyvinyl chloride (PVC), an isoprene, a thermoplastic isoprene composite, a thermoplastic copolyester, a thermoplastic copolyamide, a thermoplastic vulcanizate, any other thermoplastic elastomer, any alloy, any blend, or combination thereof. In a particular embodiment, the outer layer includes a thermoplastic polyurethane, a thermoset urethane, or combination thereof. In a more particular embodiment, the outer layer includes a thermoplastic polyurethane. In an even more particular embodiment, the thermoplastic polyurethane may be plasticized. In an embodiment, the outer layer includes an alloy of a thermoplastic urethane and polyvinyl chloride. In an embodiment, the outer layer includes a flexible polyvinyl chloride.

In an embodiment, the fluoroelastomer of the outer layer includes fluorinated ethylene propylene (FEP), perfluoroalkoxy (PFA), polyvinylidene fluoride (PVDF), or any combination thereof. In another example, the fluoroelastomer includes a copolymer of vinylidene fluoride and hexafluoropropylene; THV; a copolymer of vinylidene fluoride, hexafluoropropylene, tetrafluoroethylene, and perfluoromethyl vinyl ether; a copolymer of propylene, tetrafluoroethylene, and vinylidene fluoride; a copolymer of vinylidene fluoride, hexafluoropropylene, tetrafluoroethylene, and perfluoromethyl vinyl ether; blend, or any combination thereof.

In a particular example, the polymer of the outer layer includes a diene elastomer. The diene elastomer may be a copolymer formed from at least one diene monomer. For example, the diene elastomer may be a copolymer of ethylene, propylene and diene monomer (EPDM), a thermoplastic EPDM composite, or combination thereof. An exemplary diene monomer may include a conjugated diene, such as butadiene, isoprene, chloroprene, or the like; a non-conjugated diene including from 5 to about 25 carbon atoms, such as 1,4-pentadiene, 1,4-hexadiene, 1,5-hexadiene, 2,5-dimethyl-1,5-hexadiene, 1,4-octadiene, or the like; a cyclic diene, such as cyclopentadiene, cyclohexadiene, cyclooctadiene, dicyclopentadiene, or the like; a vinyl cyclic ene, such as 1-vinyl-1-cyclopentene, 1-vinyl-1-cyclohexene, or the like; an alkylbicyclononadiene, such as 3-methylbicyclo-(4,2,1)-nona-3,7-diene, or the like; an indene, such as methyl tetrahydroindene, or the like; an alkenyl norbornene, such as 5-ethylidene-2-norbornene, 5-butylidene-2-norbornene, 2-methallyl-5-norbornene, 2-isopropenyl-5-norbornene, 5-(1,5-hexadienyl)-2-norbornene, 5-(3,7-octadienyl)-2-norbornene, or the like; a tricyclodiene, such as 3-methyltricyclo $(5,2,1,0^2,6)$-deca-3,8-diene or the like; or any combination thereof.

In an additional example, the polymer of the outer layer may include a styrene-based elastomer. The styrene-based elastomer typically includes a styrenic based block copolymer that includes, for example, a multiblock copolymer such as a diblock, triblock, polyblock, or any combination thereof. In a particular embodiment, the styrenic based block copolymer is a block copolymer having AB units. Typically, the A units are alkenyl arenes such as a styrene, an alpha-methylstyrene, para-methylstyrene, para-butyl styrene, or combination thereof. In a particular embodiment, the A units are styrene. In an embodiment, the B units include alkenes such as butadiene, isoprene, ethylene, butylene, propylene, or combination thereof. In a particular embodiment, the B units are ethylene, isoprene, or combinations thereof. Exemplary styrenic based block copolymers include triblock styrenic block copolymers (SBC) such as styrene-butadiene-styrene (SBS), styrene-isoprene-styrene (SIS), styrene-ethylene butylene-styrene (SEBS), styrene-ethylene propylene-styrene (SEPS), styrene-ethylene-ethylene-butadiene-styrene (SEEBS), styrene-ethylene-ethylene-propylene-styrene (SEEPS), styrene-isoprene-butadiene-styrene (SIBS), or combination thereof. In an embodiment, the styrenic based block copolymer is saturated, i.e. does not contain any free olefinic double bonds. In an embodiment, the styrenic based block copolymer contains at least one free olefinic double bond, i.e. an unsaturated double bond. In a particular embodiment, the styrene-based elastomer is a styrene-ethylene based copolymer, a styrene isoprene based copolymer, a blend, or combination thereof.

In an example, the polyolefin elastomer of the outer layer may include a homopolymer, a copolymer, a terpolymer, an alloy, or any combination thereof formed from a monomer, such as ethylene, propylene, butene, pentene, methyl pentene, octene, or any combination thereof. An exemplary polyolefin elastomer includes high density polyethylene (HDPE), medium density polyethylene (MDPE), low density polyethylene (LDPE), ultra or very low density polyethylene (VLDPE), ethylene propylene copolymer, ethylene butene copolymer, polypropylene (PP), polybutene, polybutylene, polypentene, polymethylpentene, polystyrene, ethylene propylene rubber (EPR), ethylene octene copolymer, blend thereof, mixture thereof, and the like. The polyolefin elastomer further includes an olefin-based random copolymer, an olefin-based impact copolymer, an olefin-based block copolymer, an olefin-based specialty elastomer, an olefin-based specialty plastomer, a blend thereof, a mixture thereof, a combination thereof, and the like.

In a particular example, the polymer of the outer layer is self-bonding. For a self-bonding polymer, a modification to the polymer, either through grafting a chemically active functionality onto the polymeric chain within the polymer or through incorporation of a separated chemical component into the matrix of the polymer, leads to enhanced bonding between the polymer and the layer it is directly adjacent to. Any chemically active functionality, chemical component, or combination thereof are envisioned.

In an embodiment, the polymer of the outer layer has a desirable shore hardness. In a particular embodiment, the melt processable polymer of the outer layer has a shore hardness that is less than the shore hardness of the melt processable fluoropolymer of the inner layer. For instance, the outer layer is formed from a polymer having a shore A hardness of less than about 80, such as about 40 to about 80, or even about 70 to about 80, as measured by ASTM D2240.

In another example, the polymer of the outer layer has further desirable properties. For instance, the polymer of the outer layer has a much higher flexibility than the inner layer as defined by any combination of durometer (or hardness), tensile strength, elongation, and flexibility tests. In an embodiment, the outer layer has a recoverable deformation greater than 150% and the inner layer has a recoverable deformation less than 150% as per ASTM D1646.

In an exemplary embodiment, the polymer of the outer layer may further include any reasonable additive such as a crosslinking agent, a co-agent, a photoinitiator, a filler, a plasticizer, or any combination thereof. Any co-agent is envisioned that increases and/or enhances crosslinking of the polymer composition of the outer layer. In a further embodiment, the use of a co-agent may provide desirable properties such as decreased permeation of small molecules and improved elastic recovery of the outer layer compared to an outer layer that does not include a co-agent. Any co-agent is envisioned such as, for example, bis-phenol AF, triaryl isocyanurate (TAIC), triaryl cyanurate (TAC), an organic peroxide, or combination thereof. Any reasonable amount of co-agent is envisioned. Alternatively, the polymer of the outer layer may be substantially free of any crosslinking agent, co-agent, photoinitiator, filler, plasticizer, or a combination thereof. "Substantially free" as used herein refers to less than about 1.0% by weight, or even less than about 0.1% by weight of the total weight of the polymer of the outer layer.

In an example, FIG. 1 includes an illustration of a multilayer flexible tube 100 that includes three layers. In an embodiment, the tube 100 includes an inner layer 102, an outer layer 104, and a tie layer 106. For example, the inner layer 102 may directly contact the tie layer 106. In a particular example, the inner layer 102 forms an inner surface 108 of the tube. The tie layer 106 may be directly bonded to the inner layer 102 without intervening layers. In particular, the tie layer 106 is provided to increase the adhesion of the inner layer 102 to the outer layer 104. The outer layer 104 may directly contact and surround the tie layer 106.

The total thickness of the multilayer flexible tube 100 may be between about 3 mils to about 1000 mils, such as about 3 mils to about 500 mils, or even about 3 mils to about 100 mils. In an embodiment, the inner layer 102 may have a thickness of less than about 50 mils, such as less than about 20 mils, such as less than about 10 mil, or even less than about 2 mils. In an embodiment, the inner layer 102 may have a thickness in a range of about 0.5 mils to about 50 mils, such as about 0.5 mils to about 20 mils, such as about 1 mil to about 10 mils, or even about 1 mil to about 2 mils, the tie layer 106 and outer layer 104 making up the difference. In a more particular embodiment, the inner layer 102 has a thickness that is greater than the tie layer 106. For instance, the tie layer 106 may have a thickness of about 0.01 mil to about 10 mil, such as a range of about 0.1 mil to about 10 mil, such as a range of about 0.5 mil to about 10 mil, such as a range of about 1 mil to about 10 mil, or even a range of about 1 mil to about 5 mil. As illustrated in FIG. 1, the outer layer 104 may have a greater thickness than the inner layer 102. In an example, the outer layer 104 may have a thickness in a range of about 0.1 mils to about 500 mils, such as a range of about 1 mil to about 500 mil, such as a range of about 2 mil to about 100 mils, or even a range of about 5 mil to about 50 mil.

While only three layers are illustrated in FIG. 1, the multilayer flexible tube 100 may further include additional layers (not illustrated). Any additional layer may be envisioned such as an additional tie layer, an elastomeric layer, a reinforcement layer, or combination thereof. Any position of the additional layer on the multilayer flexible tube 100 is envisioned. For instance, an additional elastomeric layer may be disposed on surface 110 of the outer layer 104. In another example, an additional layer such as a reinforcement layer (not shown) may be incorporated within or between additional layers disposed in proximity to surface 110 of the outer layer 104. In an embodiment, the reinforcement layer may be disposed between the inner layer 102 and the outer layer 104. An exemplary reinforcement layer may include a wire, a fiber, a fabric, such as a woven fabric, a braid, or any combination thereof, formed of a material such as polyester, an adhesion modified polyester, a polyamide, a polyaramid, a glass, a metal, or a combination thereof.

In an embodiment, a surface of at least one layer may be treated to improve adhesion between any of the inner layer 102, the tie layer 106, the outer layer 104, or combination thereof. Any treatment is envisioned that increases the adhesion between two adjacent layers. For instance, a surface of the inner layer 102 that is directly adjacent to the tie layer 106 is treated. In an embodiment, a surface of the tie layer 106 is treated. In an embodiment, a surface of the outer layer 104 that is directly adjacent to the tie layer 106 is treated. In an embodiment, the treatment may include surface treatment, chemical treatment, sodium etching, use of a primer, or any combination thereof. In an embodiment, the treatment may include corona treatment, UV treatment, electron beam treatment, flame treatment, scuffing, sodium naphthalene surface treatment, or any combination thereof.

In an embodiment, any post-cure step may be envisioned. In particular, the post-cure step includes any radiation treatment such as, for example, e-beam treatment, gamma treatment, or combination thereof. In an example, the gamma radiation or ebeam radiation is at about 0.1 MRad to about 50 MRad. In a particular embodiment, the radiation treatment may be provided to increase interlayer and/or intralayer crosslinking.

In a particular embodiment, the multilayer flexible tube, such as a fluid conduit is formed by providing the inner layer including the fluoropolymer, providing the tie layer to overlie the inner layer, and providing the outer layer to overlie the tie layer. In an embodiment, the tie layer directly contacts the inner layer, such as without intervening adhesive or bond enhancing layers. In an embodiment, the outer layer directly contacts the tie layer, such as without intervening adhesive or bond enhancing layers.

The fluoropolymer may be provided by any method envisioned and is dependent upon the fluoropolymer chosen for the inner layer. In an embodiment, the fluoropolymer is extruded, injection molded, or mandrel wrapped. In an exemplary embodiment, the fluoropolymer is extruded. In an example, the bond surface of the inner layer is prepared with a surface treatment. In an embodiment, the fluoropolymer may be cured before, after, or during application of any further layers on the multilayer flexible tube. The inner layer may be cured in place using a variety of curing techniques such as via heat, radiation, or any combination thereof.

In an embodiment, the tie layer includes a polymeric blend as described above. The polymeric blend may be provided by any method envisioned. The method may further include providing the tie layer by any method. In an embodiment, the tie layer is extruded or injection molded. In an exemplary embodiment, the tie layer may be extruded. In a particular embodiment, the tie layer is extruded over the fluoropolymer inner layer and the tie layer is cured. In an embodiment, the tie layer may be cured before, after, or during application of any further layers on the multilayer flexible tube. In addition, the tie layer may be cured in place using a variety of curing techniques such as via heat, radiation, or any combination thereof.

The outer layer includes a polymer as described above. The polymer may be provided by any method envisioned and is dependent upon the polymer chosen for the outer layer. The method may further include providing the outer layer by any method. Providing the outer layer depends on the polymer material chosen for the outer layer. In an embodiment, the outer layer is extruded or injection molded. In an exemplary embodiment, the outer layer may be extruded. In a particular embodiment, the outer layer is extruded over the tie layer and the outer layer is cured. When additional layers are present, the outer layer may be cured before, after, or during application of any further layers on the multilayer flexible tube. In addition, the outer layer may be cured in place using a variety of curing techniques such as via heat, radiation, or any combination thereof.

In a particular embodiment, the inner layer is the melt processable fluoropolymer layer, the tie layer is a melt processable polymeric blend, and the outer layer is the melt processable polymer. In an exemplary embodiment, the inner layer is provided by heating the fluoropolymer to an extrusion viscosity and extruding the fluoropolymer to form the inner layer. The inner layer may then be cured. In an embodiment, the inner layer may be cured before, after, or during the application of any of the subsequent layers. In an exemplary embodiment, the tie layer is provided by heating the polymeric blend to an extrusion viscosity and extruding the polymeric blend to form the tie layer. In a particular embodiment, the tie layer is extruded to directly contact the inner layer. In an embodiment and depending upon the material chosen, the tie layer is optionally cured. In an embodiment, the tie layer may be cured before, after, or during the application of the outer layer. In an example, the outer layer is disposed to directly contact the tie layer. The outer layer is provided by heating the polymer to an extrusion viscosity and then extruding the polymer. The outer layer may then be cured. In an embodiment, at least two adjacent layers are co-extruded, such as the inner layer and the tie layer or the tie layer and the outer layer. In a more particular embodiment, the inner layer, tie layer, and outer layer are co-extruded. Any order of providing each layer is envisioned and any order of cure of each layer is envisioned.

In a particular embodiment, the difference of the viscosity of the fluoropolymer of the inner layer and the viscosity of the polymer of the outer layer is not greater than 25%, such as not greater than 20%, not greater than 10%, or even 0% to provide for improved processing. In a particular embodiment, the tie layer is heated to an extrusion viscosity of relative equivalence to the inner layer, the outer layer, or the difference there between. Although not being bound by theory, it is surmised that the viscosity similarity improves the adhesion of the tie layer to the inner layer and the outer layer.

Although generally described as a multilayer flexible tube, any reasonable polymeric article can be envisioned. The polymeric article may alternatively take the form of a film, a washer, or a fluid conduit. For example, the polymeric article may take the form or a film, such as a laminate, or a planar article, such as a septa or a washer. In another example, the polymeric article may take the form of a fluid conduit, such as tubing, a pipe, a hose or more specifically flexible tubing, transfer tubing, pump tubing, chemical resistant tubing, high purity tubing, smooth bore tubing, fluoropolymer lined pipe, or rigid pipe, or any combination thereof.

In a particular embodiment, the polymeric article is used as tubing or hosing to produce fuel pump tubing, reinforced hosing, chemically resistant hosing, braided hosing, and peristaltic pump hosing and tubing. In a particular embodiment, a multilayer flexible tubing is a fuel tube, a peristaltic pump tube, such as for chemical or detergent dispensing, or a liquid transfer tube, such as a chemically resistant liquid transfer tube.

Tubing includes an inner surface that defines a central lumen of the tube. For instance, tubing may be provided that has any useful diameter size for the particular application chosen. In an embodiment, the tubing may have an outside diameter (OD) of up to about 5.0 inches, such as about 0.25 inch, 0.50 inch, and 1.0 inch. In an embodiment, the tubing may have an inside diameter (ID) of about 0.03 inches to about 4.00 inches, such as about 0.06 inches to about 1.00 inches. Multilayer flexible tubing as described advantageously exhibits desired properties such as increased lifetime. For example, the multilayer flexible tube may have a pump life of at least about 12 hours of continuous operating use when tested at 600 RPM and zero back pressure on a Cole Parmer EZ Load II pump head and water as the pumping medium.

In an embodiment, the resulting multilayer flexible tube may have further desirable physical and mechanical properties. In an embodiment, the multilayer flexible tube has desirable resistance to fuel permeation of less than about 15 g/day/m$^2$, when measured by SAE J30 and SAE J1737 (in compliance with the California Air Resources Board (i.e. CARB Requirement)). Further, the inner layer, the tie layer, and the outer layer are resistant to layer separation after exposure to fuel after at least 2 weeks at 110° F. In an embodiment, the inner layer, the tie layer, and the outer layer are resistant to layer separation after exposure to fuel after at least 2 weeks at 122° F. In an embodiment, the multilayer flexible tubes are kink-resistant and appear transparent or at least translucent. For instance, the multilayer flexible tube may have a light transmission greater than about 2%, or greater than about 5% in the visible light wavelength range. In particular, the multilayer flexible tube has desirable flexibility and substantial clarity or translucency. For example, the multilayer flexible tube has a bend radius of at least 0.5 inches. For instance, the multilayer flexible may advantageously produce low durometer tubes. For example, the multilayer flexible tube has a Shore A durometer of between about 35 and about 90, such as between about 55 to about 70 as measured by ASTM D2240 having desirable mechanical properties may be formed. Such properties are indicative of a flexible material.

The multilayer flexible tube has advantageous physical properties when exposed to low temperatures. "Low temperature" as used herein refers to a temperature of less than about 0° C., such as less than about –10° C., such as less than about –20° C., or even less than about –30° C. For instance, the multilayer flexible tube has a maximum storage modulus of at least 300 MegaPascal (MPa), such as at least 350 MPa, at a temperature of about –10° C., such as about –20° C., or even about –30° C., as measured by a Dynamic Mechanical Analysis (DMA). In an embodiment, the multilayer flexible tube has flexibility at low temperature. This flexibility is particularly useful when the tube is used to access a fluid, such as fuel, at low temperature conditions. For instance, the multilayer tube has less than a 50% loss in deflection at a temperature drop of 23° C. to –18° C. Loss in deflection is discussed in more detail below.

Further, the multilayer flexible tube has advantageous physical properties when exposed to ultraviolet light. For instance, the multilayer flexible tube does not crack when exposed to ultraviolet light of 0.90 Irradiance for over 450 hours at about 60° C. Further, the materials that make up the multilayer flexible tube have a composite flexural modulus of at least about 10,000 psi, such as about 10,000 psi to about 20,000 psi, as measured by ASTM D790.

Applications for the multilayer flexible tubing are numerous. In an exemplary embodiment, the multilayer flexible tubing may be used in applications such as industrial, wastewater, digital print equipment, automotive, or other applications where chemical resistance, and/or low permeation to gases and hydrocarbons, and/or high purity are desired.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

EMBODIMENTS

Embodiment 1. A multilayer flexible tube including an inner layer including a melt processable fluoropolymer, wherein the melt processable fluoropolymer includes a terpolymer including a tetrafluoroethylene, a hexafluoropropylene, and a vinylidene fluoride (THV); a tie layer including a polymeric blend of a terpolymer including a tetrafluoroethylene, a hexafluoropropylene, and a vinylidene fluoride (THV) with a poly vinylidene fluoride (PVDF), a polyamide, a polyetheramide block copolymer, or combination thereof; and an outer layer including a melt processable polymer having a shore hardness less than a shore hardness of the inner layer.

Embodiment 2. A method of making a multilayer flexible tube including providing an inner layer including a melt processable fluoropolymer, wherein the melt processable fluoropolymer includes a terpolymer including a tetrafluoroethylene, a hexafluoropropylene, and a vinylidene fluoride (THV); providing a tie layer including a polymeric blend of a terpolymer including a tetrafluoroethylene, a hexafluoropropylene, and a vinylidene fluoride (THV) with a poly vinylidene fluoride (PVDF), a polyamide, a polyetheramide block copolymer, or combination thereof; and providing an outer layer including a melt processable polymer having a shore hardness less than a shore hardness of the inner layer.

Embodiment 3. The multilayer flexible tube or the method of making the multilayer flexible tube of any of the preceding embodiments, wherein the inner layer has a flexural modulus of less than about 20,000 psi, such as less than about 15,000 psi, such as less than about 12,000 psi, or even less than about 10,000 psi, as measured by ASTM D790.

Embodiment 4. The multilayer flexible tube or the method of making the multilayer flexible tube of any of the preceding embodiments, wherein the tie layer includes the polymeric blend of the terpolymer including the tetrafluoroethylene, the hexafluoropropylene, and the vinylidenefluoride (THV) with the poly vinylidene fluoride (PVDF).

Embodiment 5. The multilayer flexible tube or the method of making the multilayer flexible tube of embodiment 4, wherein the tie layer polymeric blend of the terpolymer including the tetrafluoroethylene, the hexafluoropropylene, and the vinylidenefluoride (THV) with the poly vinylidene fluoride (PVDF) is at a weight ratio of 1:99 to 99:1, such as about 20:80 to 80:20, or about 30:70 to 70:30.

Embodiment 6. The multilayer flexible tube or the method of making the multilayer flexible tube of any of the preceding embodiments, wherein the inner layer has a shore D of less than about 95, such as a shore A of about 80 to shore D of about 95, such as shore A of about 80 to shore D of about 65, such as shore A of about 85 to about 90 as measured by ASTM D2240.

Embodiment 7. The multilayer flexible tube or the method of making the multilayer flexible tube of any of the preceding embodiments, wherein the outer layer includes a thermoplastic polyurethane, a thermoset urethane, a fluoroelastomer, an ethylene propylene diene monomer (EPDM), a thermoplastic EPDM composite, a styrene-ethylene based copolymer, a styrene isoprene based copolymer, a polyolefin elastomer, a polyvinyl chloride (PVC), an isoprene, a thermoplastic isoprene composite, a thermoplastic copolyester, a thermoplastic copolyamide, a thermoplastic vulcanizate, a blend, an alloy, or any combination thereof.

Embodiment 8. The multilayer flexible tube or the method of making the multilayer flexible tube of embodiment 7, wherein the outer layer includes the thermoplastic polyurethane, the PVC, the thermoplastic EPDM composite, or combination thereof.

Embodiment 9. The multilayer flexible tube or the method of making the multilayer flexible tube of any of the preceding embodiments, wherein the outer layer has a shore A hardness of less than about 80, such as about 40 to about 80, or even about 70 to about 80 as measured by ASTM D2240.

Embodiment 10. The multilayer flexible tube or the method of making the multilayer flexible tube of any of the preceding embodiments, wherein the tie layer is disposed directly on the inner layer.

Embodiment 11. The multilayer flexible tube or the method of making the multilayer flexible tube of any of the preceding embodiments, wherein the outer layer is disposed directly on the tie layer.

Embodiment 12. The multilayer flexible tube or the method of making the multilayer flexible tube of any of the preceding embodiments, wherein the inner layer has a thickness of less than about 50 mils, such as less than about 20 mils, such as less than about 10 mil, or even less than about 2 mils.

Embodiment 13. The multilayer flexible tube or the method of making the multilayer flexible tube of any of the preceding embodiments, wherein the tie layer has a thickness of about 0.01 mil to about 10 mil, such as a range of about 0.1 mil to about 10 mil, such as a range of about 0.5 mil to about 10 mil, such as a range of about 1 mil to about 10 mil, or even a range of about 1 mil to about 5 mil.

Embodiment 14. The multilayer flexible tube or the method of making the multilayer flexible tube of any of the preceding embodiments, wherein the tie layer further includes an adhesion promoter.

Embodiment 15. The multilayer flexible tube or the method of making the multilayer flexible tube of embodiment 14, wherein the adhesion promoter includes a maleic anhydride grafted PVDF, a silane-based adhesion promoter, an epoxy-based chemical, an EVOH, acrylate polymer, an acrylate copolymer, an acetal copolymer, a thermoplastic with polarity, an amine functionalized adhesion promoter, an amine functionalized polymer, or combination thereof.

Embodiment 16. The multilayer flexible tube or the method of making the multilayer flexible tube of any of the preceding embodiments, wherein the flexible tube has a resistance to fuel permeation of less than about 15 g/day/m$^2$, when measured by SAE J30 and SAE J1737.

Embodiment 17. The multilayer flexible tube or the method of making the multilayer flexible tube of any of the preceding embodiments, wherein the inner layer, the tie layer, and the outer layer are resistant to layer separation after exposure to fuel after at least 2 weeks at 110° F.

Embodiment 18. The multilayer flexible tube or the method of making the multilayer flexible tube of any of the preceding embodiments, wherein the multilayer flexible tube is a fuel tube, a peristaltic pump tube, or a chemically resistant liquid transfer tube.

Embodiment 19. The multilayer flexible tube or the method of making the multilayer flexible tube of any of the preceding embodiments, wherein the inner layer, the tie layer, the outer layer, or combination thereof further includes a co-agent.

Embodiment 20. The multilayer flexible tube or the method of making the multilayer flexible tube of embodiment 19, wherein the co-agent includes bis-phenol AF, triaryl isocyanurate (TAIL), triaryl cyanurate (TAC), an organic peroxide, or combination thereof.

Embodiment 21. The multilayer flexible tube or the method of making the multilayer flexible tube of any of the preceding embodiments, wherein the multilayer flexible tube is irradiated.

Embodiment 22. The multilayer flexible tube or the method of making the multilayer flexible tube of embodiment 21, wherein irradiation includes gamma radiation or ebeam radiation at about 0.1 MRad to about 50 MRad.

Embodiment 23. The method of making the multilayer the flexible tube of any of the preceding embodiments, wherein providing the inner layer, providing the tie layer, and providing the outer layer includes extruding the inner layer, the outer layer, the tie layer, or combination thereof.

Embodiment 24. A multilayer flexible tube including an inner layer including a melt processable fluoropolymer, wherein the melt processable fluoropolymer includes a terpolymer including a tetrafluoroethylene, a hexafluoropropylene, and a vinylidene fluoride; a tie layer directly in contact with the inner layer, wherein the tie layer includes a polymeric blend of a terpolymer including a tetrafluoroethylene, a hexafluoropropylene, and a vinylidenefluoride (THV) with a poly vinylidene fluoride (PVDF); and an outer layer directly in contact with the tie layer, wherein the outer layer includes a melt processable polymer having a shore hardness less than a shore hardness of the inner layer.

Embodiment 25. The multilayer flexible tube of embodiment 24, wherein the outer layer includes a thermoplastic polyurethane, a thermoset urethane, a fluoroelastomer, an ethylene propropylene diene monomer (EPDM), a thermoplastic EPDM composite, a styrene-ethylene based copolymer, a styrene isoprene based copolymer, a polyolefin elastomer, a polyvinyl chloride (PVC), an isoprene, a thermoplastic isoprene composite, a thermoplastic vulcanizate, a blend, an alloy, or any combination thereof.

The following examples are provided to better disclose and teach processes and compositions of the present invention. They are for illustrative purposes only, and it must be acknowledged that minor variations and changes can be made without materially affecting the spirit and scope of the invention as recited in the claims that follow.

EXAMPLES

The follow compositions are compounded on a 1½" single-screw extruder.

TABLE 1

| Pre-compounded tie-layer blends (weight %) | 1 | 2 | 3 | 4 | 5 |
|---|---|---|---|---|---|
| TFE/HFP/VDF terpolymer | 30 | 40 | 45 | | |
| VDF/HFP copolymer | 70 | 60 | | | |
| Polyamide (PA11) | | | 55 | 70 | 60 |
| Polyetheramide block copolymer | | | | 30 | 40 |

These polymeric blends are screened as potential tie layers for use in multilayer tubing structures. The tie layer is used to bond a fluoropolymer, such as THV, to a lower modulus jacket layer (outer layer), such as a polyester-based thermoplastic polyurethane (TPU).

Coextruded Tubing and Peel Force

Tubing are coextruded into 3/32" ID, 3/16" OD, A/B/C multilayer structures where A=polyester-based TPU; B=blend tie layer; and C=THV. Target layer thickness are B=0.002" and C=0.003", with the balance as A. In comparison, two tubes are extruded where B=VDF/HFP copolymer; and B=Polyamide. These tie layers bond well to the TPU but not to THV.

Exemplary tubes with the tie layers of Table 1 are manually checked for bonding of the inner layer to the tie layer/jacket. Blends 1 and 2 provide the best bonding. Blends 4 and 5 do not bond well, i.e.—peeling is easy to initiate and propagate. Blend 3 bonds well. Subsequent peel testing of tubing with blends 1 and 2 as tie layers give peel force values of 18 and 26 lbf/in, respectively @ a peel rate of 10 in/min as measured by ASTM D413. Failure includes adhesive failure at the liner/tie-layer interface; at the tie-layer/outer layer interface; or cohesive failure of the tie-layer. With these materials, the failure mode is that the liner separates from the tie-layer.

E-Beam Crosslinking and Fuel Soaks

Tubes are subjected to e-beam cross-linking using a voltage of 4.5 MeV and a beam current of 34 mAmps to achieve irradiation of about 4 MRad.

The tubes are for tested for fuel resistance by immersing them in CE10 fuel at 50° C. (122° F.) and periodically inspected for delamination. Results are shown in Table 2.

TABLE 2

| Tie-layer | e-beam | Delamination |
|---|---|---|
| Blend 1 | no | @ 2 week |
| Blend 1 | yes | No delamination @ 6 weeks |
| Blend 2 | no | No delamination @ 6 weeks |
| Blend 2 | yes | No delamination @ 6 weeks |

Tubing and Droop Angle

Figure 2:
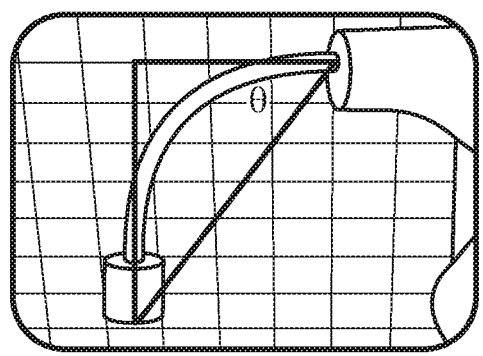
FIG. 2 is an exemplary photo of a tube and a depiction of the droop/deflection measurement.
Figure 2:
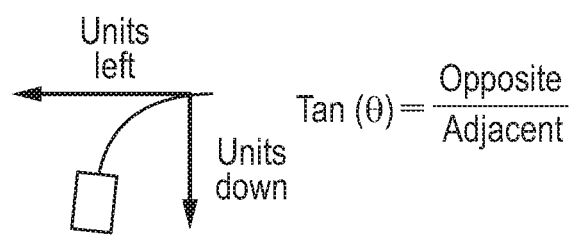
Figure 3:
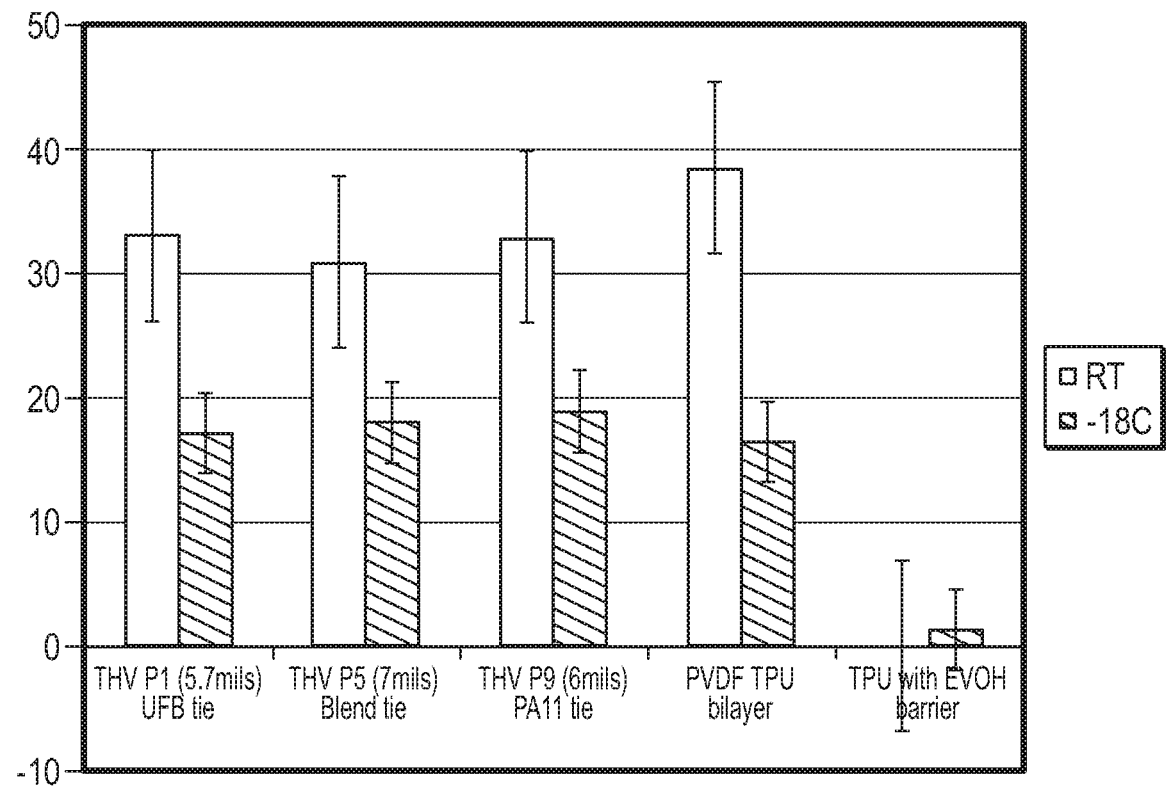
FIG. 3 is a graphical depiction of degree of droop/deflection of an exemplary multilayer flexible tube compared to other tubing.

Further, the flexibility of exemplary multilayer tubes is measured at room temperature (23° C.) and at a low temperature of −18° C. The degree of droop/deflection is measured by placing a weight (about 20 grams) on one end of a 6 inch tube and fixing the opposite end of the tube. From the point at which the tube is fixed, the units down and across to the end of the weight are measured. The angle (θ) is determined using trigonometry of Tan (θ)=opposite/adjacent, with the units measured across as the adjacent length and the units measured down as the opposite length. A second reading is taken with the tube turned 180° to take into consideration the natural curvature of the tube. The two angle readings are averaged to give the degree of droop. An exemplary photo of the tube and depiction of the measurement can be seen in FIG. 2. As seen in FIG. 3, the exemplary tube with a THV blended tie layer has a desirable degree of droop from 23° C. to −18° C. compared to other tubes, their construction indicated in Table 3.

TABLE 3

| Sample name | # of layers | Tube construction (2 layer: inner/outer) or (3 layer: inner/tie/outer) | ID/OD inches |
|---|---|---|---|
| THV P1 UFB tie layer | 3 | THV (5.7 mils thick)/Melt processable PVDF-HFP copolymer/TPU | 0.094/0.1875 |
| THV P5 Blend tie layer | 3 | THV (7 mils thick)/Blend 2/TPU | 0.094/0.1875 |
| THV P9 PA11 tie layer | 3 | THV (6 mils thick)/PA11/TPU | 0.094/0.1875 |
| PVDF TPU bilayer | 2 | Melt processable PVDF-HFP copolymer/TPU | 0.094/0.1875 |
| TPU with EVOH barrier | 3 | 85 Shore A TPU/EVOH/85 Shore A TPU | 0.094/0.1875 |

The higher the degree of droop is an indication of greater flexibility. As such, the exemplary tube with the THV blended tie layer (THV/Blend 2/TPU tube) maintains desirable flexibility at room temperature and −18° C.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A multilayer flexible tube comprising:
   an inner layer comprising a melt processable fluoropolymer, wherein the melt processable fluoropolymer comprises a terpolymer comprising a tetrafluoroethylene, a hexafluoropropylene, and a vinylidene fluoride (THV);
   a tie layer consisting of a polymeric blend of a terpolymer consisting of a tetrafluoroethylene, a hexafluoropropylene, and a vinylidene fluoride (THV), the terpolymer blended with a polymer consisting of a copolymer of a poly vinylidene fluoride (PVDF) and a hexafluoropropylene (HFP), a polyetheramide block copolymer, or combination thereof; and
   an outer layer comprising a melt processable polymer having a shore hardness less than a shore hardness of the inner layer.

2. The multilayer flexible tube of claim 1, wherein the inner layer has a flexural modulus of less than about 20,000 psi, such as less than about 15,000 psi, such as less than about 12,000 psi, or even less than about 10,000 psi, as measured by ASTM D790.

3. The multilayer flexible tube of claim 1, wherein the tie layer consists of the polymeric blend of the terpolymer consisting of the tetrafluoroethylene, the hexafluoropropylene, and the vinylidenefluoride (THV) with the copolymer of the poly vinylidene fluoride (PVDF) and the hexafluoropropylene (HFP).

4. The multilayer flexible tube of claim 1, wherein the inner layer has a shore D of less than about 95, such as a shore A of about 80 to shore D of about 95, such as shore A of about 80 to shore D of about 65, such as shore A of about 85 to about 90 as measured by ASTM D2240.

5. The multilayer flexible tube of claim 1, wherein the outer layer has a shore A hardness of less than about 80, such as about 40 to about 80, or even about 70 to about 80 as measured by ASTM D2240.

6. The multilayer flexible tube of claim 1, wherein the tie layer is disposed directly on the inner layer.

7. The multilayer flexible tube of claim 1, wherein the outer layer is directly disposed on the tie layer.

8. The multilayer flexible tube of claim 1, wherein the inner layer has a thickness of less than about 50 mils, such as less than about 20 mils, such as less than about 10 mil, or even less than about 2 mils.

9. The multilayer flexible tube of claim 1, wherein the tie layer further comprises an adhesion promoter.

10. The multilayer flexible tube of claim 1, wherein the flexible tube has a resistance to fuel permeation of less than about 15 g/day/m$^2$, when measured by SAE J30 and SAE J1737.

11. The multilayer flexible tube of claim 1, wherein the inner layer, the tie layer, and the outer layer are resistant to layer separation after exposure to fuel after at least 2 weeks at 110° F.

12. The multilayer flexible tube of claim 1, wherein the multilayer flexible tube is a fuel tube, a peristaltic pump tube, or a chemically resistant liquid transfer tube.

13. The multilayer flexible tube of claim 1, wherein the inner layer, the tie layer, the outer layer, or combination thereof further comprises a co-agent.

14. The multilayer flexible tube of claim 1, wherein the outer layer comprises a thermoplastic polyurethane, a thermoset urethane, a fluoroelastomer, an ethylene propylene diene monomer (EPDM), a thermoplastic EPDM composite, a styrene-ethylene based copolymer, a styrene isoprene based copolymer, a polyolefin elastomer, a polyvinyl chloride (PVC), an isoprene, a thermoplastic isoprene composite, a thermoplastic copolyester, a thermoplastic copolyamide, a thermoplastic vulcanizate, a blend, an alloy, or any combination thereof.

15. The multilayer flexible tube of claim 14, wherein the outer layer comprises the thermoplastic polyurethane, the PVC, the thermoplastic EPDM composite, or combination thereof.

16. A multilayer flexible tube comprising:
   an inner layer comprising a melt processable fluoropolymer, wherein the melt processable fluoropolymer comprises a terpolymer comprising a tetrafluoroethylene, a hexafluoropropylene, and a vinylidene fluoride (THV);
   a tie layer directly in contact with the inner layer, wherein the tie layer consists of a polymeric blend of a terpolymer consisting of a tetrafluoroethylene, a hexafluoropropylene, and a vinylidenefluoride (THV), the terpolymer blended with a polymer consisting of a copolymer of a poly vinylidene fluoride (PVDF) and a hexafluoropropylene (HFP); and
   an outer layer directly in contact with the tie layer, wherein the outer layer comprises a melt processable polymer having a shore hardness less than a shore hardness of the inner layer.

17. The multilayer flexible tube of claim 16, wherein the outer layer comprises a thermoplastic polyurethane, a thermoset urethane, a fluoroelastomer, an ethylene propropylene diene monomer (EPDM), a thermoplastic EPDM composite, a styrene-ethylene based copolymer, a styrene isoprene based copolymer, a polyolefin elastomer, a polyvinyl chloride (PVC), an isoprene, a thermoplastic isoprene composite, a thermoplastic copolyester, a thermoplastic copolyamide, a thermoplastic vulcanizate, a blend, an alloy, or any combination thereof.

* * * * *